(12) United States Patent
Wegener

(10) Patent No.: US 8,777,239 B2
(45) Date of Patent: Jul. 15, 2014

(54) SCOOTER ASSEMBLIES AND SCOOTER DECK ASSEMBLIES

(71) Applicant: Andreas Wegener, Encinitas, CA (US)

(72) Inventor: Andreas Wegener, Encinitas, CA (US)

(*) Notice: Subject to any disclaimer, the term of this patent is extended or adjusted under 35 U.S.C. 154(b) by 0 days.

(21) Appl. No.: 13/757,658

(22) Filed: Feb. 1, 2013

(65) Prior Publication Data

US 2013/0147139 A1 Jun. 13, 2013

Related U.S. Application Data

(63) Continuation of application No. 13/045,861, filed on Mar. 11, 2011.

(51) Int. Cl.
*B62M 1/00* (2010.01)

(52) U.S. Cl.
USPC ............... 280/87.041; 280/87.01; 280/87.021

(58) Field of Classification Search
USPC .............................. 280/87.041, 87.01, 87.021
See application file for complete search history.

(56) References Cited

U.S. PATENT DOCUMENTS

| | | | |
|---|---|---|---|
| 3,990,713 A | 11/1976 | Hokanson | |
| 4,040,639 A * | 8/1977 | Scardenzan | 280/87.042 |
| 4,161,326 A | 7/1979 | Gaber | |
| 4,199,165 A * | 4/1980 | Spitzke | 280/87.042 |
| 4,834,407 A * | 5/1989 | Salvo | 280/87.042 |
| 4,911,457 A | 3/1990 | Ishikawa | |
| 5,267,743 A | 12/1993 | Smisek | |
| 5,927,733 A | 7/1999 | Banda | |
| 6,059,315 A * | 5/2000 | Selph | 280/809 |
| 6,173,976 B1 | 1/2001 | Lee | |
| 6,203,037 B1 * | 3/2001 | Wilson et al. | 280/87.042 |
| 6,234,501 B1 | 5/2001 | Chen | |
| 6,244,605 B1 | 6/2001 | Liu | |
| 6,260,866 B1 | 7/2001 | Cheng | |
| 6,273,440 B1 * | 8/2001 | Wilson | 280/87.042 |
| 6,279,929 B1 | 8/2001 | Fruechtenicht | |
| 6,305,869 B1 | 10/2001 | Chen | |
| 6,322,092 B1 | 11/2001 | Chen | |
| 6,367,829 B1 | 4/2002 | Lee | |
| 6,378,880 B1 | 4/2002 | Lin | |
| 6,485,039 B1 | 11/2002 | Ming-Fu | |
| 6,527,284 B2 * | 3/2003 | Bert | 280/87.041 |

(Continued)

FOREIGN PATENT DOCUMENTS

| | | |
|---|---|---|
| DE | 10 2004 029 961 A1 | 1/2006 |
| EP | 2174860 A1 | 4/2010 |

*Primary Examiner* — J. Allen Shriver, II
*Assistant Examiner* — James M Dolak
(74) *Attorney, Agent, or Firm* — McKenna Long & Aldridge LLP

(57) ABSTRACT

A deck assembly for a scooter comprises a deck and at least one grind stripe. The deck has a front end, a rear end, a top surface, and a bottom surface. The bottom surface of the deck defines at least one longitudinal mating recess. The grind stripe has a mating protrusion, a substantially flat mating surface, and a grinding surface. The grind stripe is slidably attachable to the deck such that the mating protrusion is disposed in the longitudinal mating recess and the mating surface of the grind stripe mates with the bottom surface of the deck. A scooter deck assembly comprises a deck and an angled front plug. The deck has a front end, a rear end, a top surface, and a bottom surface. The angled front plug is attached to the front end of the deck such that the front plug extends substantially beyond the front end of the deck.

15 Claims, 16 Drawing Sheets

(56) References Cited

U.S. PATENT DOCUMENTS

| | | | |
|---|---|---|---|
| 6,648,345 B2* | 11/2003 | Lee | 280/11.27 |
| 7,007,977 B1 | 3/2006 | Gallagher | |
| 7,226,081 B2 | 6/2007 | Chen | |
| 7,581,739 B2* | 9/2009 | Fraley | 280/87.041 |
| 7,635,137 B2* | 12/2009 | Gregory et al. | 280/87.05 |
| 7,954,831 B1 | 6/2011 | Yeh | |
| 8,002,296 B2* | 8/2011 | Meader | 280/87.042 |
| 8,146,947 B2* | 4/2012 | Hadley | 280/816 |
| 8,251,395 B2* | 8/2012 | Ellison | 280/608 |
| 2002/0030339 A1 | 3/2002 | Powers | |
| 2002/0093167 A1 | 7/2002 | Jones et al. | |
| 2002/0108798 A1 | 8/2002 | Huntsberger et al. | |
| 2002/0135142 A1* | 9/2002 | Hinds | 280/87.041 |
| 2002/0153685 A1* | 10/2002 | Day et al. | 280/87.042 |
| 2002/0167142 A1 | 11/2002 | Chen | |
| 2002/0180169 A1 | 12/2002 | Kwok | |
| 2003/0151214 A1* | 8/2003 | Chen | 280/11.209 |
| 2004/0021283 A1* | 2/2004 | Serling | 280/87.042 |
| 2005/0001399 A1 | 1/2005 | Yeo et al. | |
| 2005/0104329 A1* | 5/2005 | Ellison | 280/608 |
| 2005/0230931 A1 | 10/2005 | Chen | |
| 2005/0248112 A1 | 11/2005 | Iavarone et al. | |

* cited by examiner

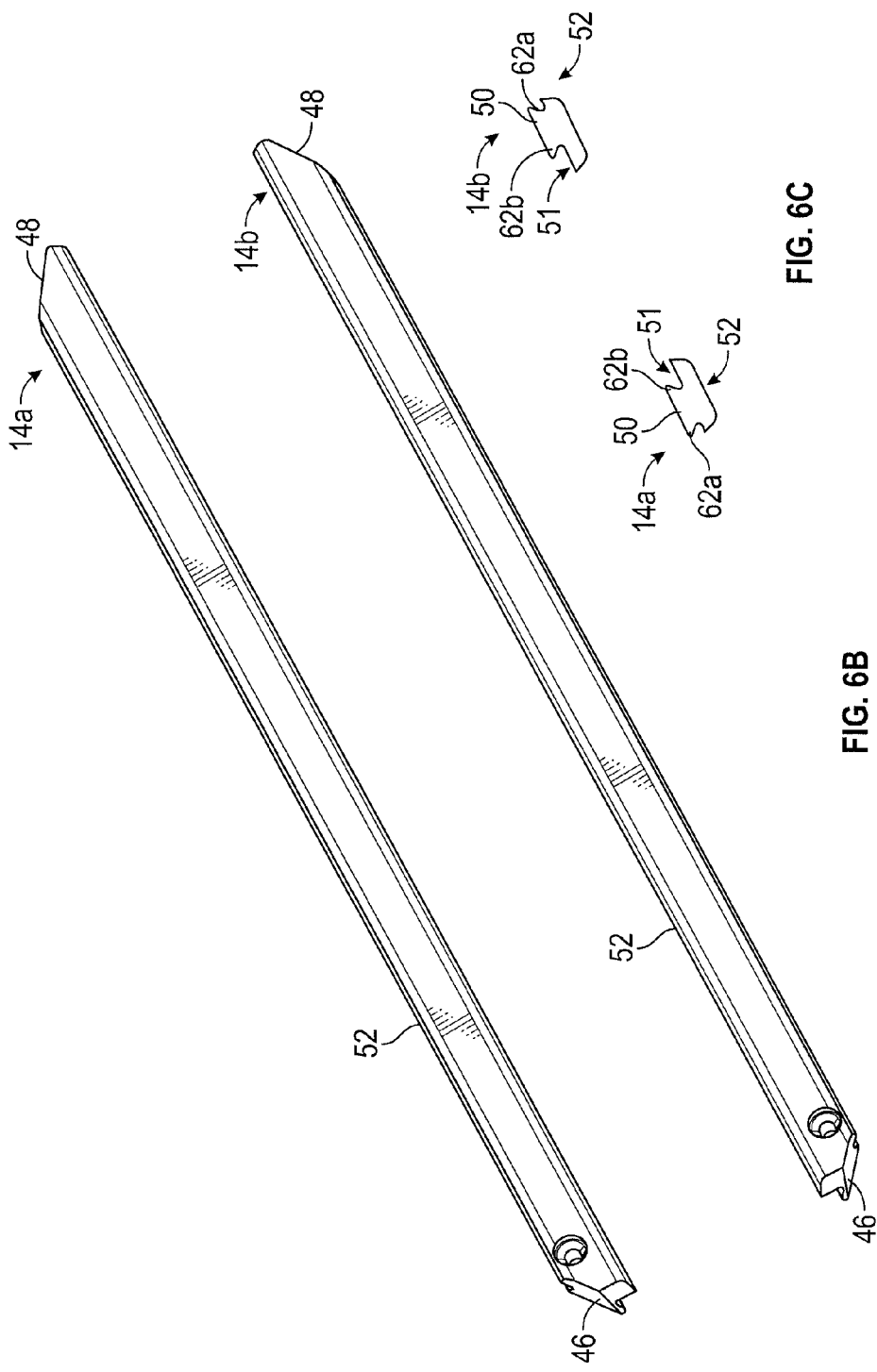

SCOOTER ASSEMBLIES AND SCOOTER DECK ASSEMBLIES

CROSS-REFERENCE TO RELATED APPLICATION

This application is a continuation-in-part of and claims priority to U.S. patent application Ser. No. 13/045,861 filed Mar. 11, 2011, which is hereby incorporated by reference in its entirety.

FIELD

The present disclosure relates to scooter assemblies and scooter deck assemblies.

BACKGROUND

Freestyle scootering is an increasingly popular action sport. There are several freestyle scooter competitions and exhibitions held annually in which participants engage in stylized riding and a variety of tricks. In addition, riders use scooters for exercise and recreation in parks, city streets, sidewalks, driveways, and parking lots. Some of this activity includes use of different structures such as stairs, curbs, ledges, handrails, speedbumps, and gaps.

These activities cause wear and tear on the scooters and often result in cracked or broken scooters. One particularly common problem is cracking of the scooter deck. Traditional scooter decks are made of metal, often aluminum, which wears down quickly and needs to be replaced frequency. Metal decks also have disadvantages for popular riding activities such as grinding. In particular, grinding on steel rails with a metal deck causes the scooter to move too fast and compromises the rider's control of the scooter, while grinding on concrete curbs or ledges slows down the scooter and damages the deck.

An existing solution for protecting the deck of the scooter is a deck saver. Currently, deck savers are substantially flat metal plates that bolt onto the bottom of the scooter deck. However, existing deck savers have significant disadvantages. Because they typically have at least four bolt and locknut attachment assemblies, they can be tedious and time consuming to attach to the scooter deck. Furthermore, the use of metal for the deck saver may hinder performance of grinding tricks by the user by adding significant weight to the scooter, making it more difficult to maneuver.

A solution for damage to the front end of the scooter deck is a front plug attached thereto. However, existing front plugs typically are not designed for maneuverability and impede "nose blunt" grind tricks.

Accordingly, there is a need for a scooter deck assembly that includes a deck saver component that is easy to attach and facilitates popular activities and tricks such as grinding while protecting the bottom of the scooter deck. There also is a need for a scooter with a more secure connection of the deck and deck saver without adding significant weight to the scooter. Finally, a need exists for a front plug that facilitates maneuverability of the scooter and "nose blunt" grind tricks.

SUMMARY

The present disclosure, in its many embodiments, alleviates to a great extent the disadvantages of known scooters by providing a deck assembly for a scooter that includes at least one grind stripe that may be slidably attachable to the deck so that the bottom surface of the deck is protected from damage. The grind stripe may have a mating protrusion that is disposed in a longitudinal mating recess in the bottom of the deck. In addition, a front plug is provided that extends past the front end of the scooter and is angled to facilitate nose blunt tricks.

Exemplary embodiments of a deck assembly for a scooter comprise a deck and at least one grind stripe. The deck has a front end, a rear end, a top surface, and a bottom surface. The bottom surface of the deck defines at least one longitudinal mating recess. The grind stripe has a mating protrusion, a substantially flat mating surface, and a grinding surface. The grind stripe is slidably attachable to the deck such that the mating protrusion is disposed in the longitudinal mating recess and the mating surface of the grind stripe mates with the bottom surface of the deck.

In exemplary embodiments, the grind stripe and the deck comprise interlocking dovetail slide-in features. The at least one longitudinal mating recess may comprise two longitudinal mating recesses on opposite sides of the bottom surface of the deck. In exemplary embodiments, the at least one grind stripe comprises two grind stripes.

In exemplary embodiments, the deck assembly further comprises a front plug attached to the front end of the deck. The front plug may extend substantially beyond the front end of the deck and may be angled. In exemplary embodiments, the front plug has an angle of 30-60° relative to the bottom surface of the deck.

Exemplary embodiments include a scooter deck assembly comprising a deck and angled front plug. The deck has a front end, a rear end, a top surface, and a bottom surface. The angled front plug is attached to the front end of the deck such that the front plug extends substantially beyond the front end of the deck. In exemplary embodiments, the angle of the front plug is in the range of 30-60° relative to the bottom surface of the deck.

In exemplary embodiments, the scooter deck assembly further comprises at least one grind stripe attached to the bottom surface of the deck. The grind stripe may have a mating protrusion, a substantially flat mating surface, and a grinding surface, and the bottom surface of the deck may define at least one longitudinal mating recess. In exemplary embodiments, the grind stripe is slidably attachable to the deck such that the mating protrusion is disposed in the longitudinal mating recess and the mating surface of the grind stripe mates with the bottom surface of the deck.

Exemplary embodiment further include a scooter assembly comprising a deck having a front end, a rear end, a top surface, a bottom surface, and two side surfaces and at least one grind stripe attached to the bottom surface of the deck. The scooter assembly further comprises a neck joined to the deck at or near the front end of the deck, a head tube fixedly attached to the neck, and a steer tube extending through the head tube. A front fork is movably coupled to a bottom portion of the steer tube. a front wheel is coupled to the front fork, and a rear wheel is coupled to the deck at or near the rear end of the deck. The scooter assembly may further comprise a handlebar assembly attached to the steer tube at or near a top portion of the steer tube.

In exemplary embodiments, the grind stripe is a substantially flat longitudinal member. The at least one grind stripe may comprise two grind stripes. In other exemplary embodiments, the grind stripe has a mating protrusion, a substantially flat mating surface, and a grinding surface, and the bottom surface of the deck defines at least one longitudinal mating recess. The grind stripe may be slidably attachable to the deck such that the mating protrusion is disposed in the longitudinal mating recess and the mating surface of the grind stripe mates with the bottom surface of the deck. The grind stripe and the deck may also comprise interlocking dovetail slide-in features. In exemplary embodiments, the scooter assembly further comprises an angled front plug attached to the front end of the deck such that the front plug extends substantially beyond the front end of the deck.

Accordingly, it is seen that scooter assemblies are provided which protect the bottom and sides of the scooter deck, prevent misalignment problems, and provide strong, but lightweight scooters. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which:

FIG. 6B is a bottom perspective view of an embodiment of a pair of grind stripes in accordance with the present disclosure;

FIG. 6C is a front perspective view of an embodiment of a pair of grind stripes in accordance with the present disclosure;

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
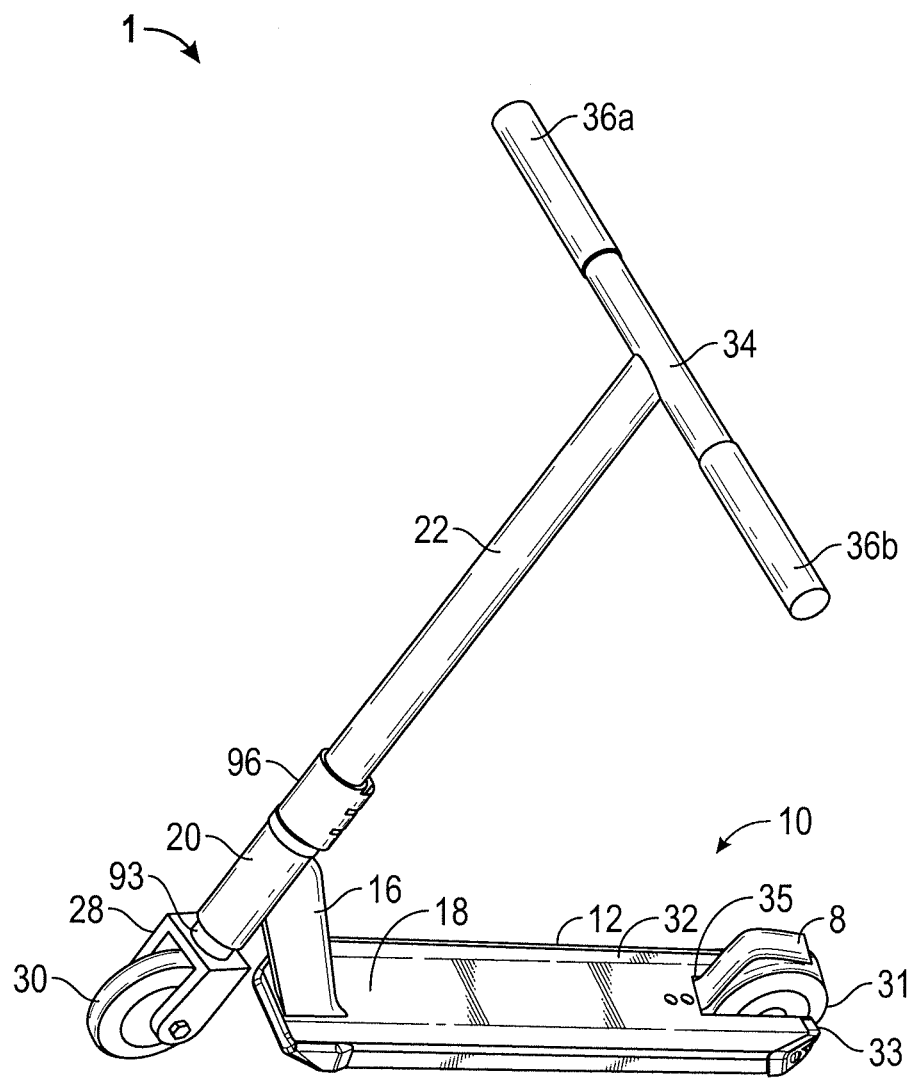
FIG. 1 is a perspective view of an embodiment of a scooter assembly in accordance with the present disclosure.
Figure 2:
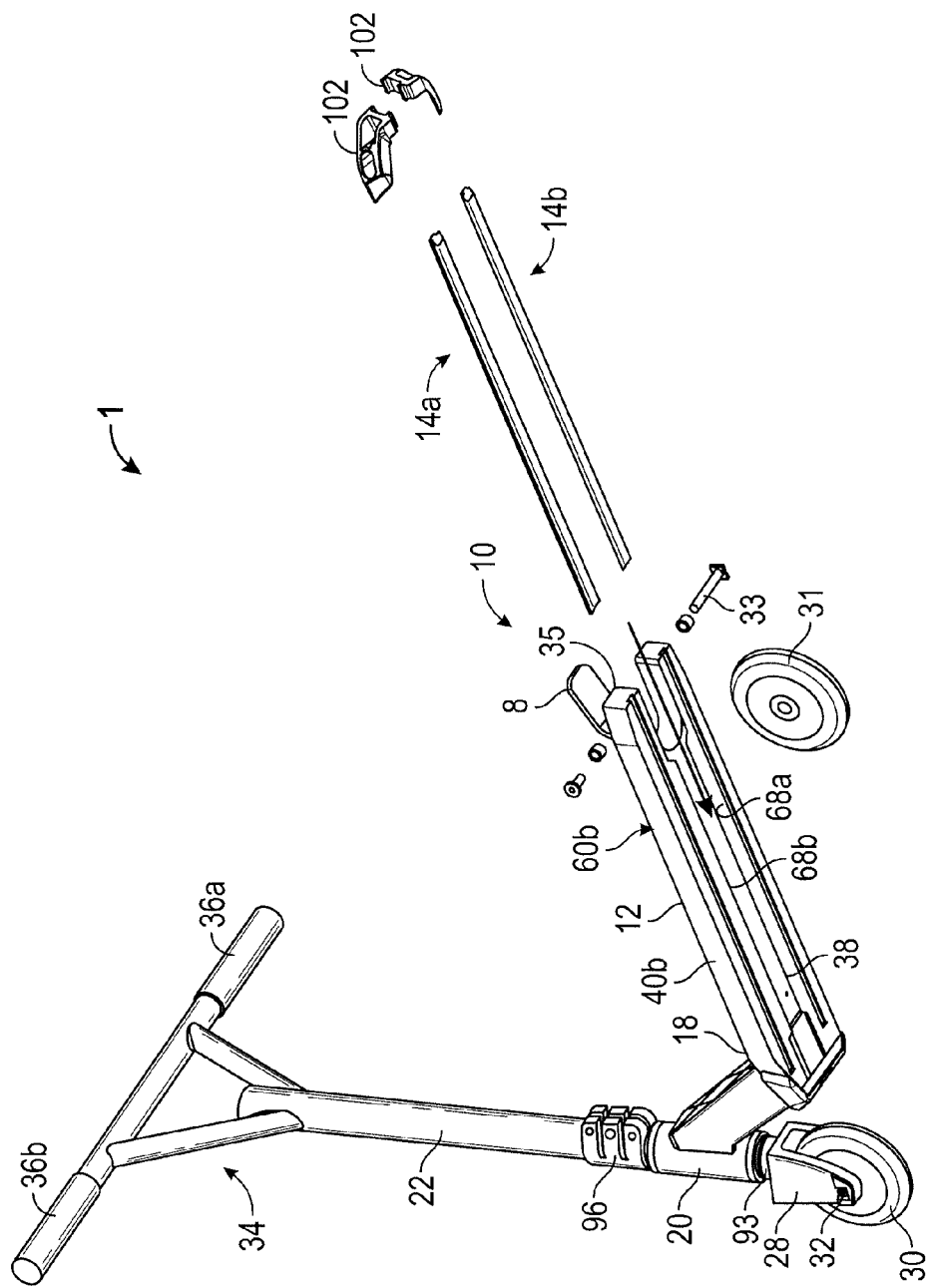
FIG. 2 is a perspective view of an embodiment of a scooter assembly in accordance with the present disclosure.

FIGS. 1 and 2 show an exemplary embodiment of a scooter assembly 1 that includes a deck assembly 10 comprised of deck 12 and one or more grind stripes 14. Neck 16 is joined to deck 12 at or near a front end 18 of the deck 12. A head tube 20 is fixedly attached to the neck 16, which serves to operatively connect the deck 12 to the front wheel and the handlebar assemblies. The neck 16 may be integrally formed with the deck 12 such that the deck 12 and neck 16 are a single machined component. Alternatively, the neck 16 and head tube 20 may be integrally formed as a single component. The neck 16 and head tube 20 may be made of various metals, plastic, carbon fiber, or other materials that impart sufficient structural strength but are not so heavy that they compromise maneuverability of the scooter.

Steer tube 22 has a top portion 24 and a bottom portion 26 and extends through the head tube 20. Front fork 28 is movably coupled to the bottom portion 26 of the steer tube 22 and has a front wheel 30 coupled thereto via front wheel axle 32. At the top portion 24 of the front fork 28 a handlebar assembly 34 is attached, providing handles 36a, 36b for the rider to grip and steer the scooter. Turning the handlebar assembly 34 causes steer tube 22 to turn the front fork 28 and front wheel 30. A brake 8 may be fixedly attached to or integrally formed with a rear end 35 of deck 12, which also has a rear wheel 31 coupled thereto via a rear wheel axle 33. The rear wheel 31 may be turnable or a fixed position wheel.

Figure 3:
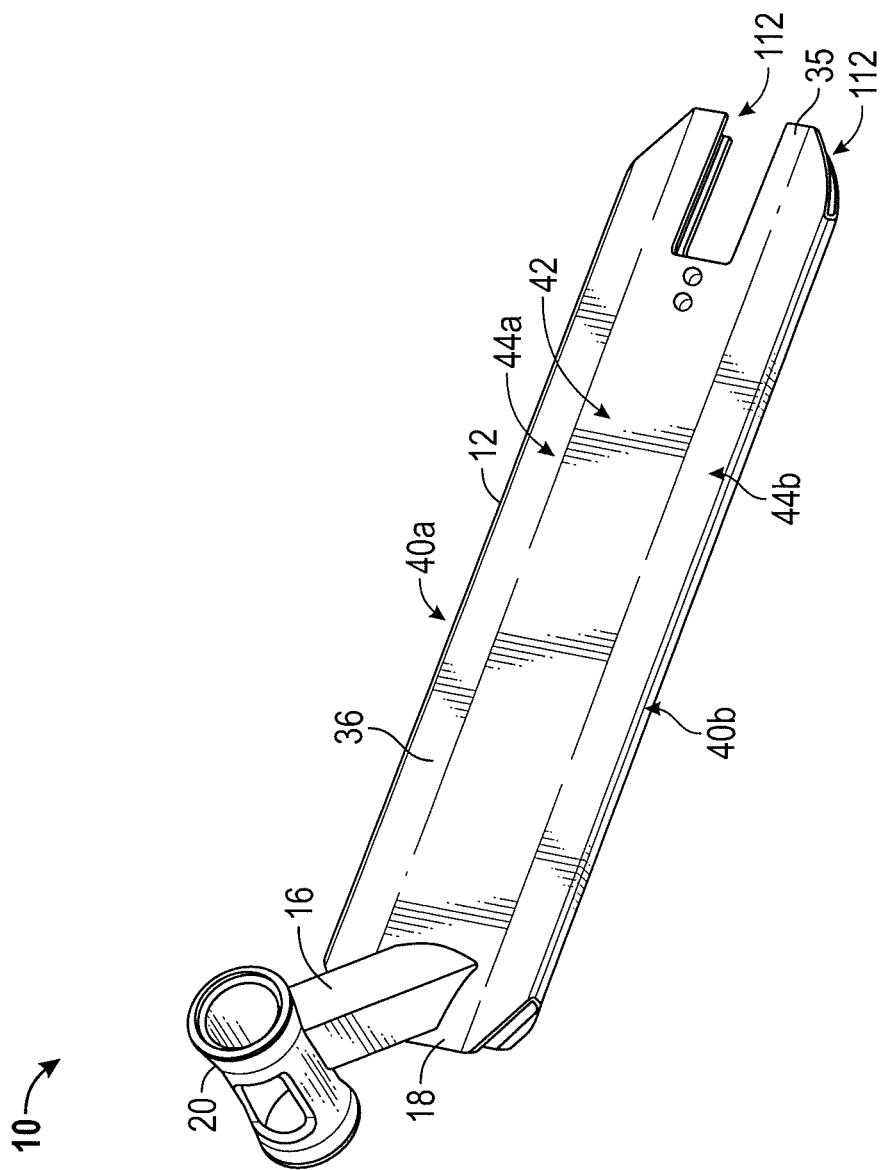
FIG. 3 is a perspective view of an embodiment of a scooter deck in accordance with the present disclosure.
Figure 4:
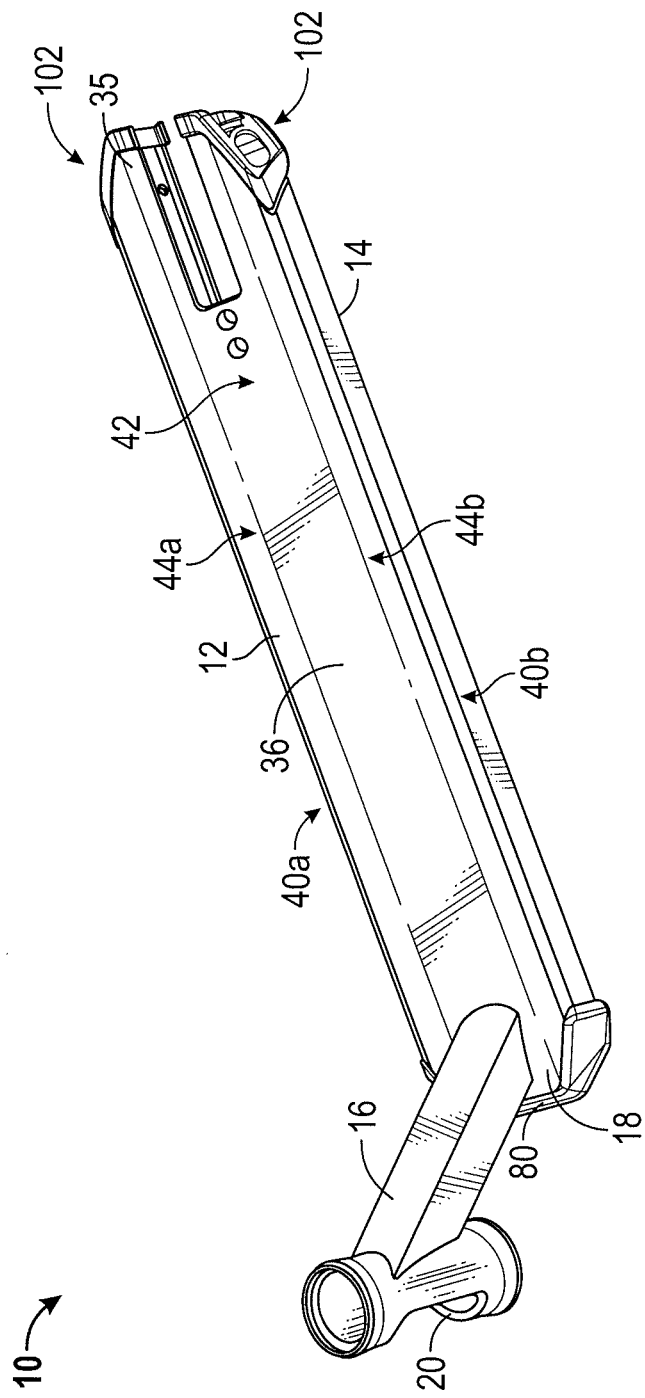
FIG. 4 is a perspective view of an embodiment of a scooter deck assembly in accordance with the present disclosure.
Figure 5:
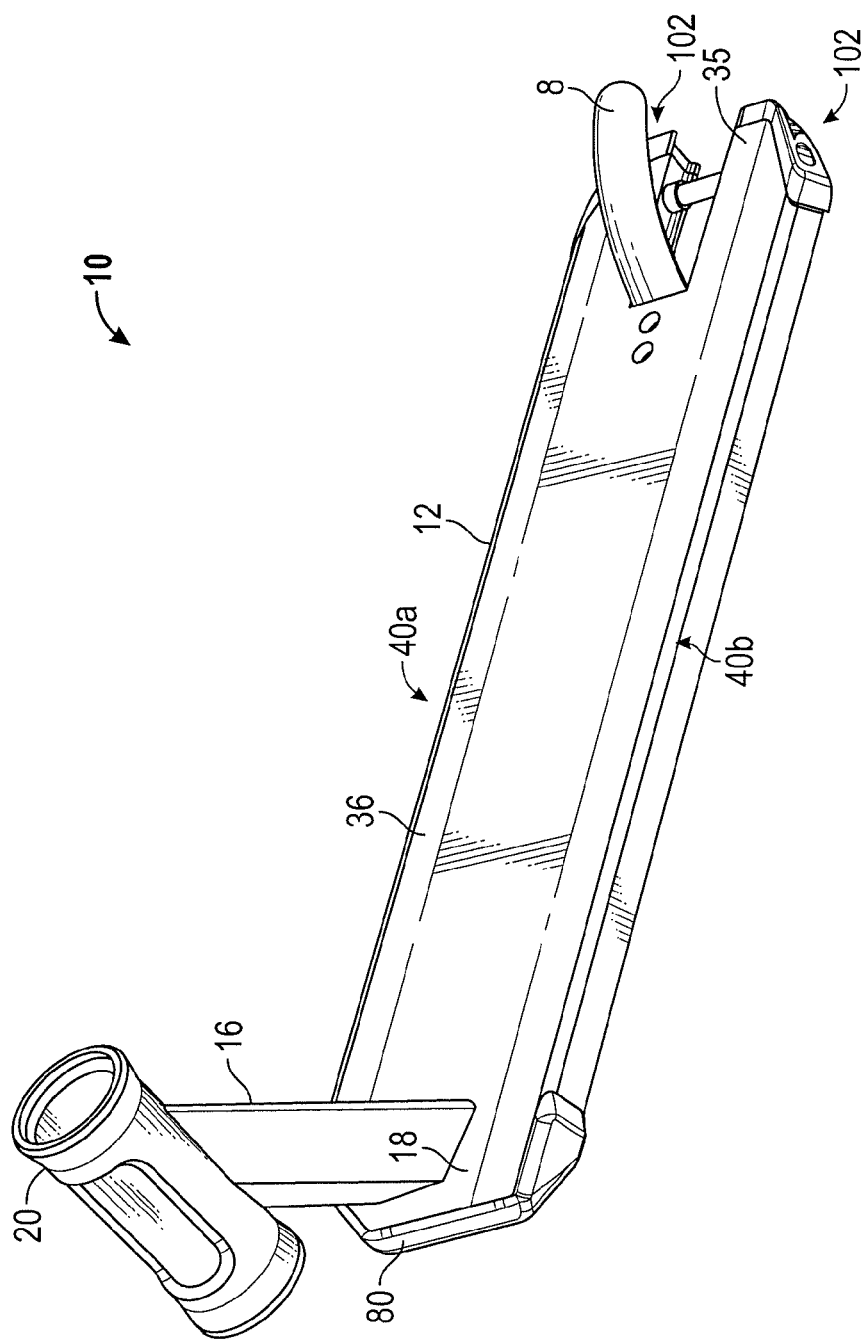
FIG. 5 is a perspective view of an embodiment of a scooter deck assembly in accordance with the present disclosure.

With reference to FIGS. 3-5, exemplary embodiments of a deck assembly will now be described. Deck assembly 10 comprises a deck 12 and at least one grind stripe 14 that is attachable to the deck 12. Deck 12 is an elongate member that has a front end 18, a rear end 35, a top surface 36, a bottom surface 38, and two opposite side surfaces 40a, 40b. The deck 12 is the component of the scooter assembly 1 on which the rider stands during use, and may include certain design features to allow the rider better balance and control of the scooter assembly with his feet. For example, as best seen in FIGS. 3 and 4, a central portion 42 of the deck 12 may be flat while two opposite lateral portions 44a, 44b may be disposed at a slight angle to central portion 42. This configuration allows the rider to balance by locating his feet on the central portion 42 and turn or engage in certain tricks by moving one or both feet onto a lateral portion 44. The deck 12 may be extruded to be substantially hollow, thereby providing strength and support for the rider while reducing the weight of the scooter assembly.

Figure 6A:
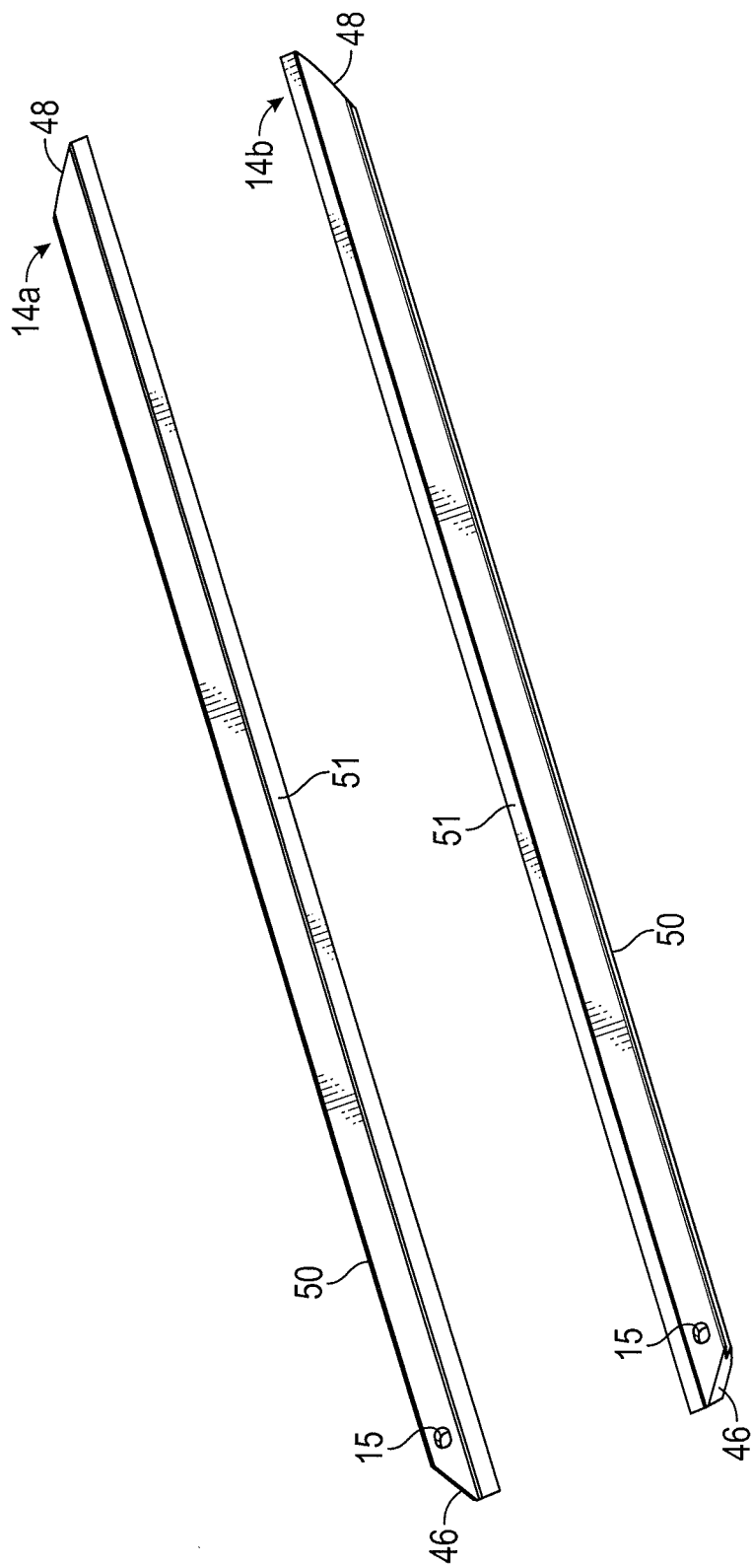
FIG. 6A is a top perspective view of an embodiment of a pair of grind stripes in accordance with the present disclosure.
Figure 7A:
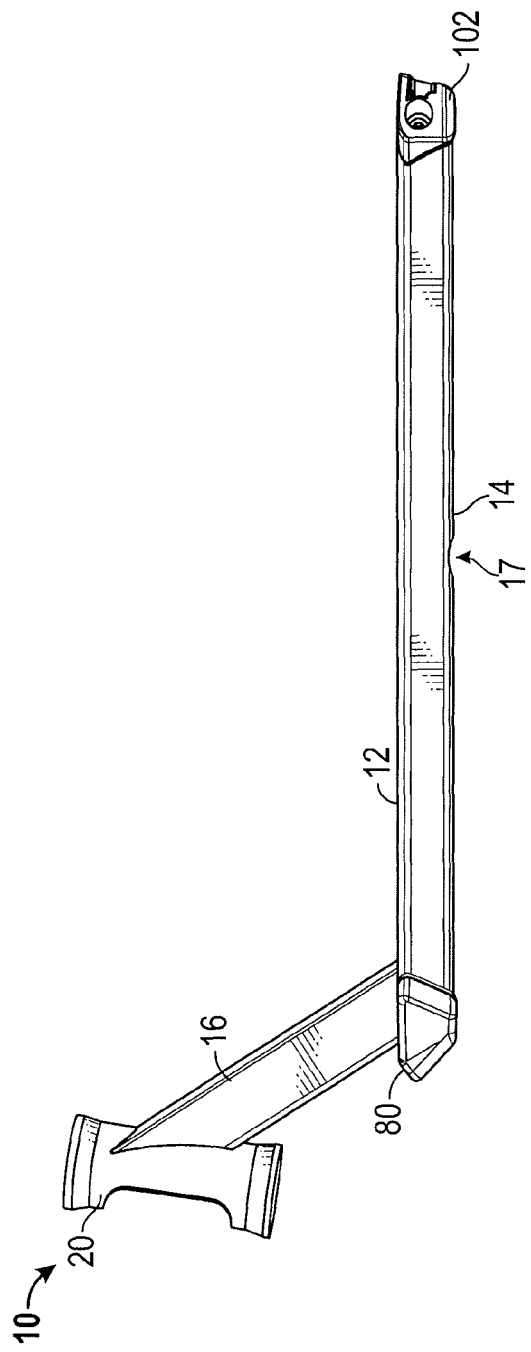
FIG. 7A is a side view of an embodiment of a scooter deck assembly in accordance with the present disclosure.
Figure 7B:
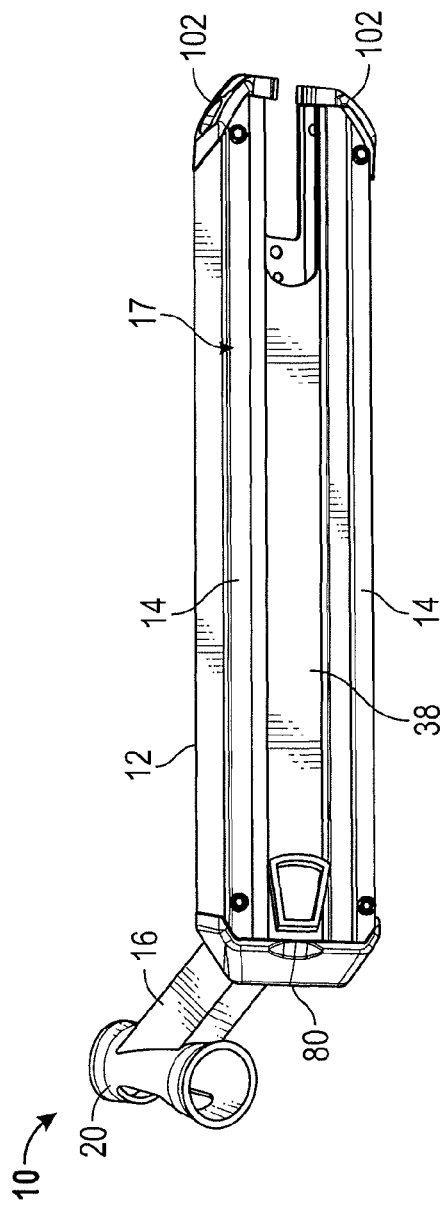
FIG. 7B is a bottom perspective view of an embodiment of a scooter deck assembly in accordance with the present disclosure.

An exemplary embodiment of a grind stripe 14, shown in FIGS. 6A-6C, includes a front end 46, a rear end 48, a mating protrusion 50, a substantially flat mating surface 51, and a bottom surface that serves as a grinding surface 52. As discussed in more detail herein, the mating protrusion 50 is sized and shaped to include dovetail slide-in features such as flanges 62a, 62b to fit securely into longitudinal mating recess 60 of the deck 12. Also discussed in more detail herein is the substantially flat mating surface 51 being designed to mate with the bottom surface 38 of the deck 12. In exemplary embodiments, the grind stripe 14 is made of a plastic material, but other materials may be used such as metals, metal alloys, carbon fiber, and other composite materials. The grind stripe 14 may define an aperture 15 at or near its front end 46 extending vertically therethrough to receive a fastener, such as a screw, to assist with securing the grind strip 14 to the deck 12. As best seen in FIGS. 7A and 7B, a groove 17 may be defined in the grinding surface 52 of the grind stripe 14 to facilitate certain grinding tricks.

Figure 8:
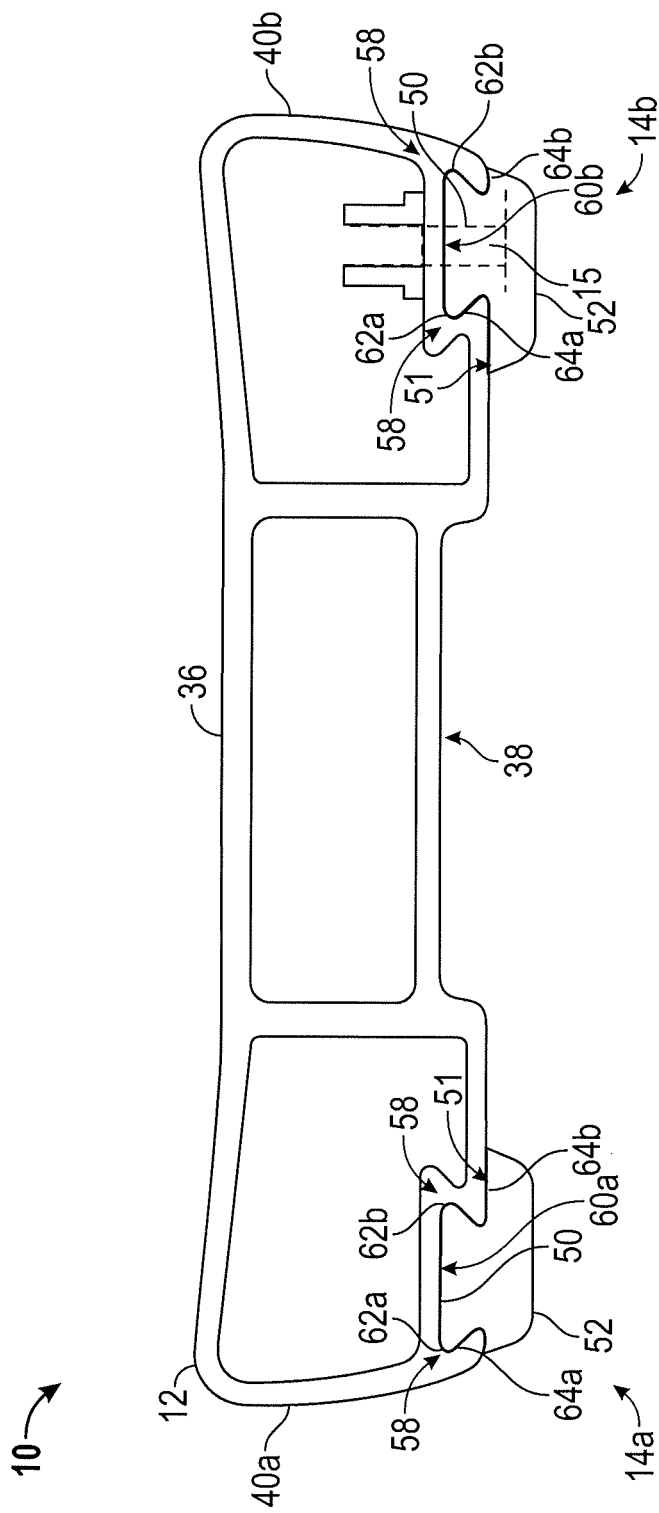
FIG. 8 is a cut away cross-sectional view of an embodiment of a scooter deck assembly in accordance with the present disclosure.

Referring now to FIGS. 7A-8, exemplary deck assemblies including grind stripes will be described. Grind stripe 14 is designed to mate with the deck 12. More particularly, the grind stripe 14 can be slidably attached to the deck 12 by virtue of the mating protrusion 50 of the grind plate 14 mating with the longitudinal mating recess 60 in the bottom surface 38 of the deck 12. As best seen in FIG. 8, grind stripe 14 and deck 12 have complementary locking features. Any locking features can be used so long as they provide a secure connection between the mating protrusion 50 of the grind stripe 14 and the bottom surface 38 of the deck 12 and facilitate slidable attachment and detachment. Alternative embodiments may forgo mating features for a substantially flat grind stripe securable to the deck by conventional fasteners such as screws only.

In exemplary embodiments, the complementary locking features of the deck 12 and grind stripe 14 comprise interlocking dovetail slide-in features 56 and 58. Dovetail slide-in features 56 include flanges 62a, 62b that are extensions of the mating protrusion 50 of the grind stripe 14 and longitudinal mating recesses 60a, 60b defined in the bottom surface 38 of the deck 12 and sized to slidably receive flanges 62a, 62b. Dovetail slide-in features 58 of the mating recess 60 may include angled extensions 64a, 64b that help to form the mating recess 60 in the bottom surface 38 of the deck 12 and slidably receive the flanges 62a, 62b of the mating protrusion 50 of the grind stripe 14.

This structure and configuration results in the substantially flat mating surface 51 of the grind stripe 14 mating with the bottom surface 38 of the deck 12. More particularly, the interlocking dovetail slide-in features 56 and 58 of the mating protrusion 50 and the mating recess 60, respectively, lock the grind stripe 14 to the deck 12 such that the substantially flat mating surface 51 of the grind stripe 14 forms a close fit and is held closely adjacent to the bottom surface 38 of the deck 12. As best seen in FIG. 8, exemplary embodiments feature two longitudinal mating recesses 60a, 60b defined in opposite sides of the bottom surface 38 of the deck 12. Two grind stripes 14a, 14b may be provided, each slidably disposed in a corresponding mating recess 60a, 60b. Rear plugs 102 may also be provided. Rear plugs 102 may be attached to the rear end 35 of the deck 12 to protect the deck and the rear end 48 of the grind stripes 14.

Figure 9:
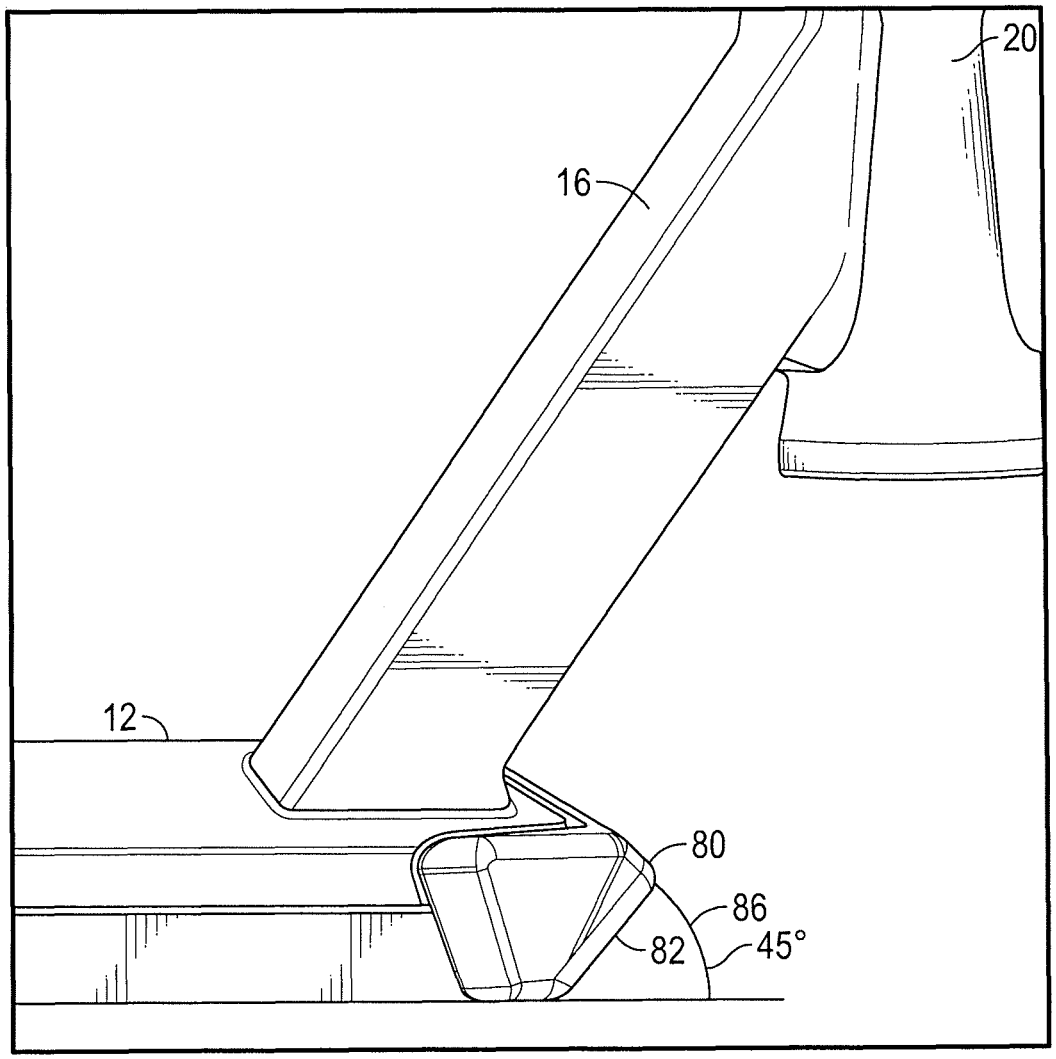
FIG. 9 is a detail view of an embodiment of a front plug in accordance with the present disclosure.

Exemplary embodiments of a scooter deck assembly 10 including a front plug 80 will be described with reference to FIGS. 5 and 9. An exemplary deck assembly 10 comprises a deck 12 and at least one front plug 80 that is attachable to the deck 12. As described above, deck 12 is an elongate member that has a front end 18, a rear end 35, a top surface 36, a bottom surface 38, and two opposite side surfaces 40a, 40b. The deck 12 is typically part of a scooter assembly 1.

Front plug 80, illustrated in FIGS. 9 and 10A-10E, is a component having an angled front surface 82, a mating side 84, including at least one connection part 88, that mates with the front end 18 of the deck 12. The front surface 82 of the front plug 80 may have a range of angles relative to the bottom surface 38 of the deck 12 so long as it enables the rider to do "nose blunt" grind tricks with the front end 18 of the scooter. In exemplary embodiments, the angle 86 of the front surface 82 of the front plug 80 is between about 30° and about 60° relative to the bottom surface 38 of the deck 12, and in further exemplary embodiments the angle is about 45°.

Figure 10A:
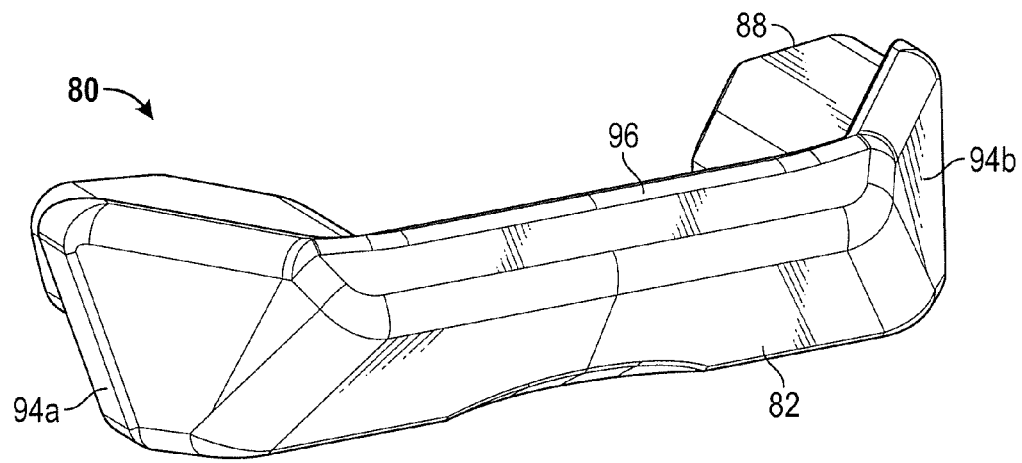
FIG. 10A is a front perspective view of an embodiment of a front plug in accordance with the present disclosure.
Figure 10B:
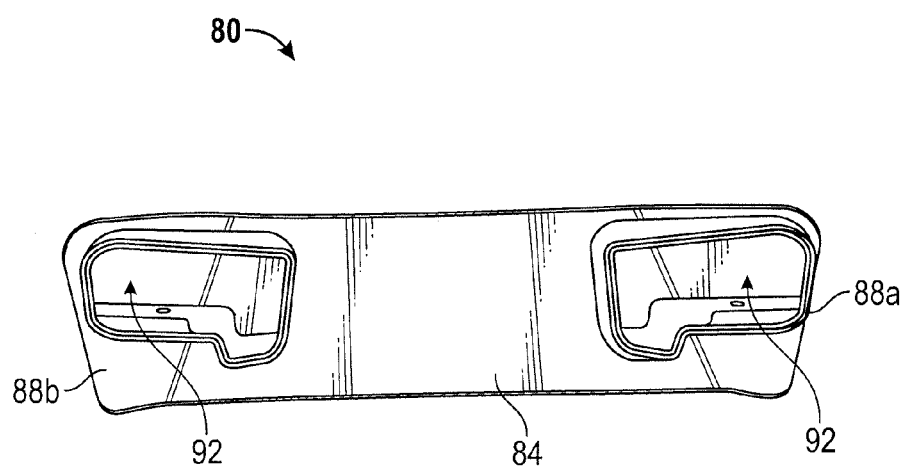
FIG. 10B is a rear perspective view of the front plug of FIG. 10A.
Figure 10C:
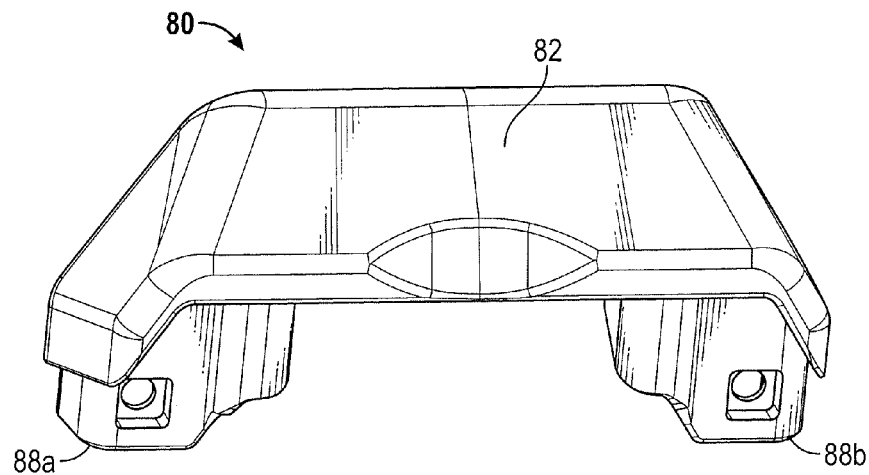
FIG. 10C is a bottom perspective view of the front plug of FIG. 10A.
Figure 10D:
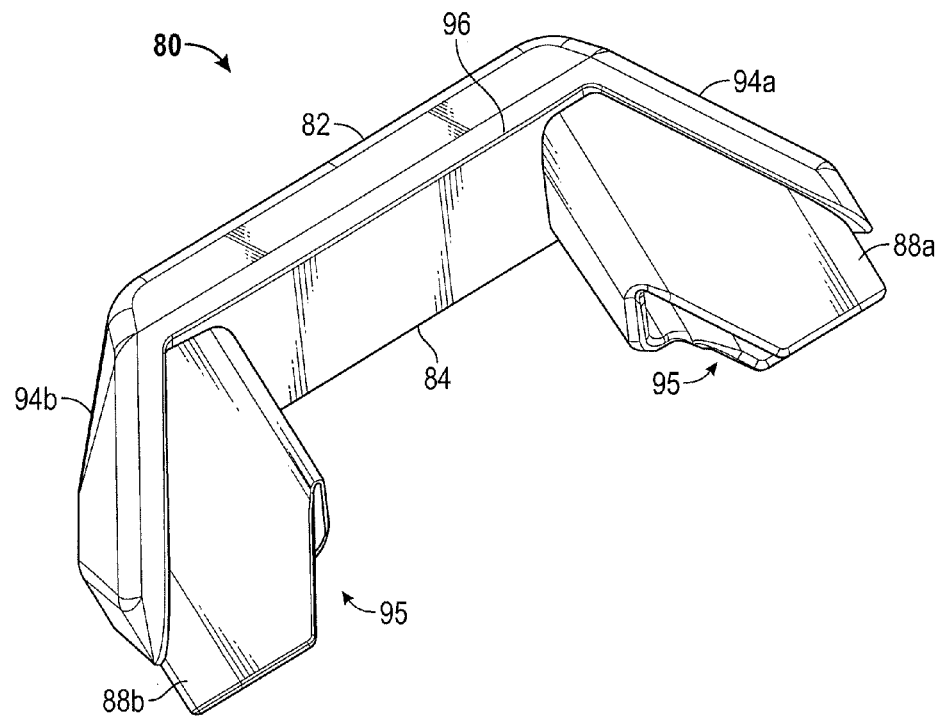
FIG. 10D is a top perspective view of the front plug of FIG. 10A.
Figure 10E:
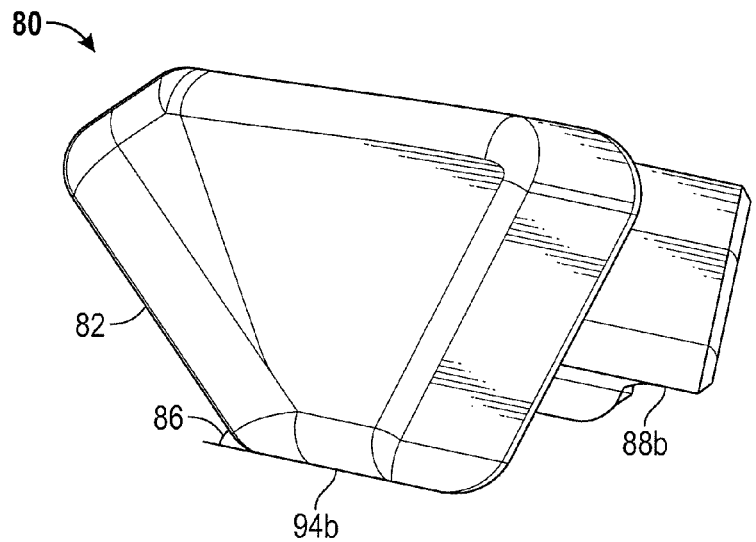
FIG. 10E is a side perspective view of the front plug of FIG. 10A.
Figure 11A:
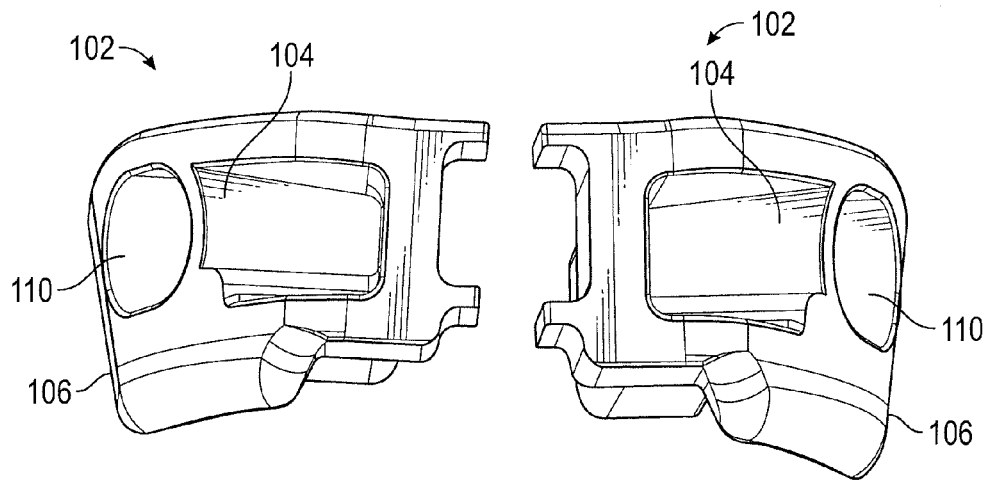
FIG. 11A is a front perspective view of an embodiment of a pair of rear plugs in accordance with the present disclosure.
Figure 11B:
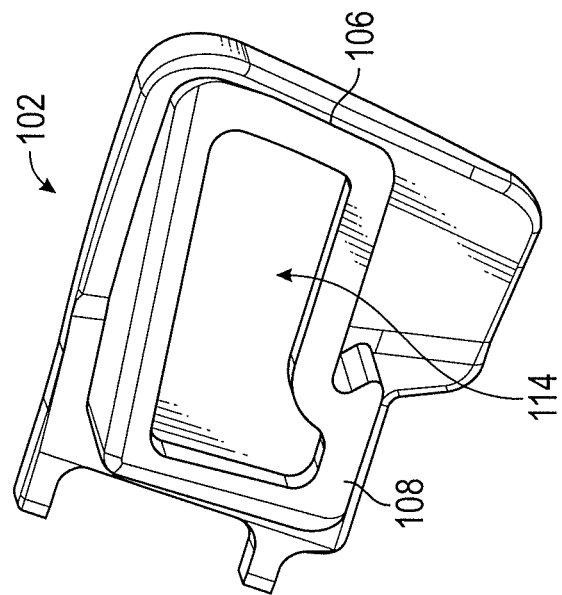
FIG. 11B is a rear perspective view of the rear plugs of FIG. 11A.
Figure 11B:
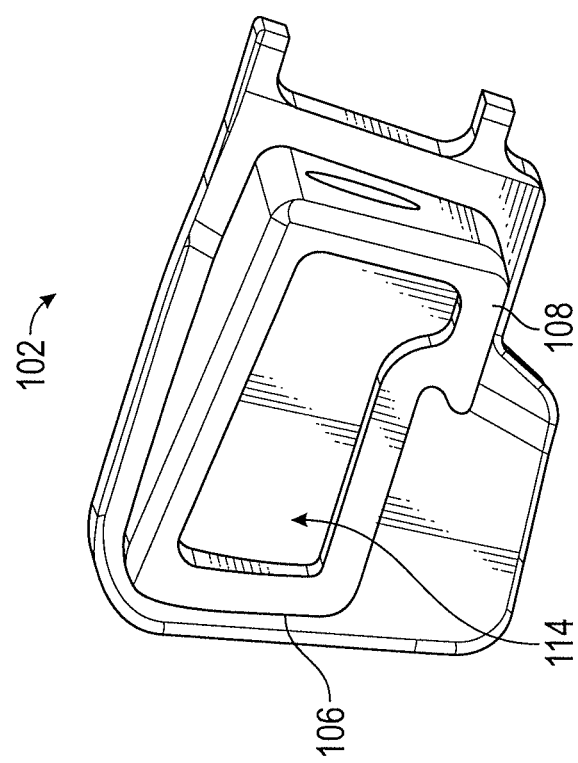
Figure 11C:
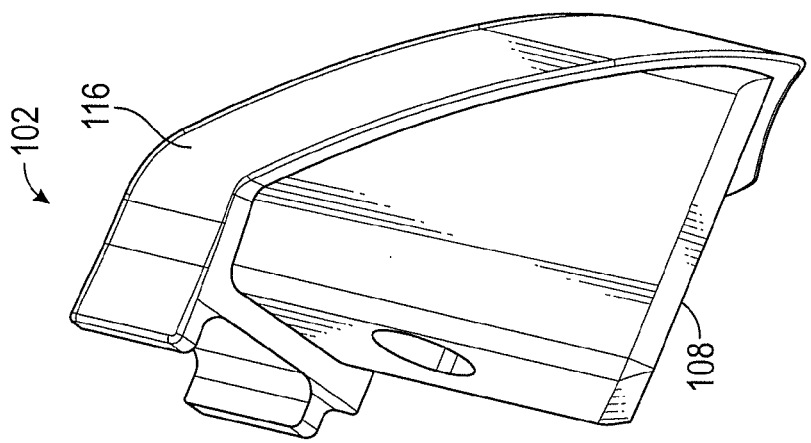
FIG. 11C is a top perspective view of the rear plugs of FIG. 11A.
Figure 11C:
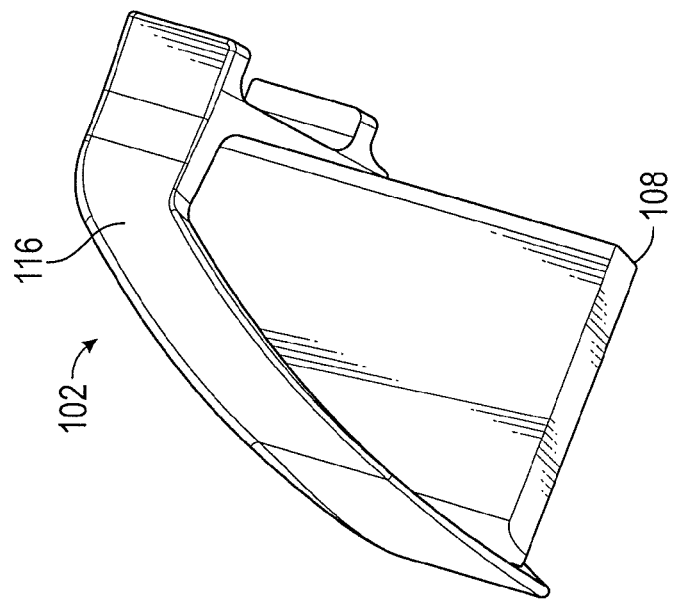
Figure 11D:
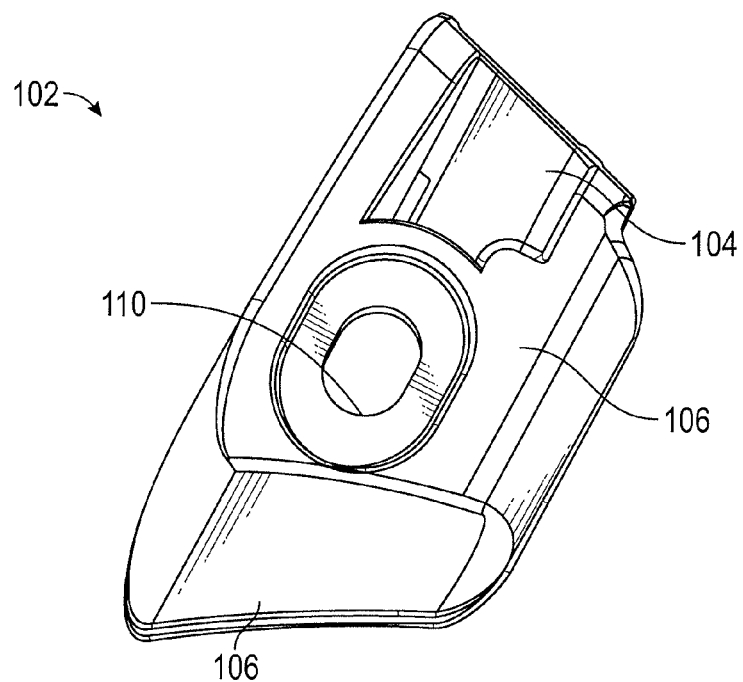
FIG. 11D is a side perspective view of the rear plugs of FIG. 11A.

As best seen in FIGS. 10B and 10D, the mating side 84 of the front plug 80 may include two connection parts 88a, 88b, which extend from the front plug 80 perpendicular to the mating side. Each connection part 88a, 88b is an extrusion sized and shaped to fit securely into front openings 90 defined in the front end 18 of the scooter deck 12. The connection part 88 may be solid or may define a hollow space 92 to reduce the weight of the part. An angled cutaway 95 may be provided to facilitate connection to the front end 18 of the deck 12. Similarly, the front surface 82 of the front plug 18 may have angled wrap around portions 94a, 94b on each side to match the angled shape of the front end 18 of the scooter deck 12 and provide better aerodynamics. Also advantageously, the front surface 82 and angled wrap around portions 94a, 94b of the front plug 18 may have a lip 96 that extends over and above the front end 18 of the scooter deck 12 when attached to the deck. This feature further enables the rider to do nose blunt grind tricks.

Exemplary rear plugs 102 are illustrated in FIGS. 11A-11D. A rear plug 102 has a rear outer surface 104, a side outer surface 106, and a deck mating part 108. The side outer surface 106 may define an aperture 110 through which a fastener can be inserted to connect the rear plug 102 to the rear end 35 of the scooter deck 12. The deck mating part 108 is an extrusion sized and shaped to fit securely into rear openings 112 defined in the rear end 35 of the deck 12. The deck mating part 108 may be solid or may define a hollow space 114 to reduce the weight of the part. The rear outer surface may have a lip 116 that extends over and above the rear end 35 of the scooter deck 12 when attached to the deck. As mentioned above, the rear plugs 102 protect the deck and the rear end 48 of the grind stripes 14. In particular, the rear plugs 102 can extend past the axle bolt of the scooter deck assembly 12, which will hold it in place with not need for additional screws or fixtures.

In operation, the rider attaches the grind stripe 14 to the scooter deck 12 by first lining it up either in front of the front end 18 of the deck 12 or behind the rear end 35 of the deck 12 such that the mating protrusion 50 of the grind stripe 14 lines up with the longitudinal mating recess 60 defined in the bottom surface 38 of the deck 12. More particularly, the rider lines up the grind stripe 14 and the deck 12 so that the flanges 62a, 62b of the mating protrusion 50 of each grind stripe 14a, 14b line up with the angled extensions 64a, 64b that help to form each respective mating recess 60a, 60b.

As shown in FIG. 2, each grind stripe 14 is then either slid forward until its front end 46 is even with the front end 33 of the deck 12 or until its rear end 48 is even with the rear end 35 of the deck 12 so each grind stripe 14a, 14b is disposed in its respective mating recess 60a, 60b and the complementary locking features of the deck 12 and grind stripe 14 slide into full engagement. Specifically, the interlocking dovetail slide-in features 56 and 58 interlock and connect each grind stripe 14 to the deck 12 when the angled channels 68a, 68b of the longitudinal mating recesses 60a, 60b fully receive flanges 62a, 62b of the mating protrusion 50 of each grind plate 14.

As such, the interlocking dovetail slide-in features 56 and 58 of the mating protrusion 50 and the mating recess 60, respectively, lock the grind stripe 14 to the deck 12 such that the substantially flat mating surface 51 of the grind stripe 14 forms a close fit and is held closely adjacent to the bottom surface 38 of the deck 12. Additional fasteners such as screws 70 may be used to provide a more secure connection. In the case of an alternative flat grind stripe without complementary locking features, the rider secures each grind stripe to an opposite portion of the bottom surface 38 of the scooter deck and fastens the grind stripe to the deck using fasteners such as screws.

It should be noted that the interlocking dovetail slide-in features design optimizes the mating connection of the deck assembly by providing a slidable connection mechanism, namely, dovetail slide-in features 56 and 58. One of the important advantages of disclosed embodiments of the deck assembly 10 is that the grind stripes 14 are very light weight. Another advantage is the relative ease of attachment, as described above, and ease of detachment. Removal of the grind stripe 14 is a simple procedure in which the rider slides the grind stripe 14 in the reverse direction to disengage the interlocking dovetail slide-in features 56 and 58.

The rider may install the front plug 80 by first lining it up with the front end 18 of the scooter deck 12 so the mating side 84 of the front plug 80 is directly in front of the front end 18 of the deck 12. More particularly, the user lines up the connection parts 88a, 88b of the mating side 84 of the front plug 80 with the front openings 90 defined in the front end 18 of the scooter deck 12. Then the user firmly pushes the front plug 80 and the scooter deck 12 together such that the connection parts 88a, 88b slide in and are disposed within the front openings 90 of the deck 12, the mating side 84 of the front plug 80 is directly adjacent the front end 18 of the deck 12. In this configuration, the angled wrap around portions 94a, 94b on each side of the front surface 82 of the front plug 18 will completely cover and protect the front end 18 of the scooter deck 12. In addition, the lip 96 will extend over and above the front end 18 of the scooter deck 12.

Figure 12:
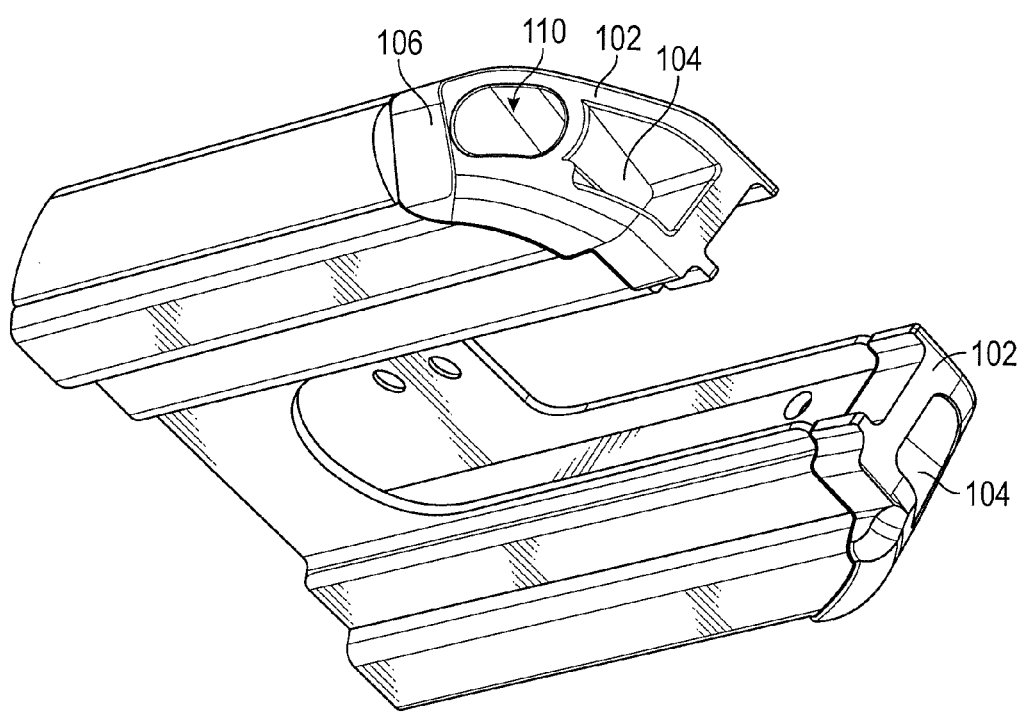
FIG. 12 is a detail view of an embodiment of a pair of rear plugs in accordance with the present disclosure.

The rider may also attach the rear plugs 102 by first lining each rear plug with the rear end 35 of the scooter deck 12 and the rear end 48 of each grind stripe 14. More particularly, each rear plug is placed so its deck mating part 108 is lined up with a rear opening 112 defined in the rear end 35 of the deck 12. The rider than pushes each rear plug 102 onto the scooter deck 12 such that the deck mating part 108 slides in and is disposed within the rear opening 112 of the deck 12. The rider may then secure each rear plug 102 to the deck 12 by inserting a fastener through aperture 110 in the side outer surface 106 of the rear plug 102. In this configuration, the lip 116 of the rear outer surface 104 of the rear plug will extend over and above the rear end 35 of the scooter deck 12. Moreover, as best seen in FIG. 12, the rear outer surface 104 and the side outer surface 104 together extend so they fully protect both the rear end 35 of the scooter deck 12 and the rear end 48 of each grind stripe 14.

Thus, it is seen that scooter assemblies and scooter deck assemblies are provided. It should be understood that any of the foregoing configurations and specialized components or may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A deck assembly for a scooter, comprising:
   a deck having a front end, a rear end, a top surface, and a bottom surface, the bottom surface of the deck defining at least one longitudinal mating recess;
   at least one grind stripe having a mating protrusion, a substantially flat mating surface, and a grinding surface;
   the grind stripe being slidably attachable to the deck by sliding the grind stripe in a forward direction from the rear end of the deck to the front end of the deck such that the mating protrusion is disposed in the longitudinal mating recess and the mating surface of the grind stripe mates with the bottom surface of the deck.

2. The deck assembly of claim 1 wherein the grind stripe and the deck comprise interlocking dovetail slide-in features.

3. The deck assembly of claim 1 wherein the at least one longitudinal mating recess comprises two longitudinal mating recesses on opposite sides of the bottom surface of the deck.

4. The deck assembly of claim 3 wherein the at least one grind stripe comprises two grind stripes.

5. The deck assembly of claim 1 further comprising a front plug attached to the front end of the deck.

6. The deck assembly of claim 5 wherein the front plug extends substantially beyond the front end of the deck.

7. The deck assembly of claim 5 wherein the front plug has an angle of 30-60° relative to the bottom surface of the deck.

8. A scooter assembly comprising:
   a deck having a front end, a rear end, a top surface, a bottom surface, and two side surfaces;
   a neck joined to the deck at or near the front end of the deck;
   a head tube fixedly attached to the neck;
   a steer tube extending through the head tube;
   a front fork movably coupled to a bottom portion of the steer tube and a front wheel coupled to the front fork;
   a rear wheel coupled to the deck at or near the rear end of the deck; and
   at least one grind stripe attached to the bottom surface of the deck, the grind stripe being slidably attachable to the deck by sliding the grind stripe in a forward direction from the rear end of the deck to the front end of the deck.

9. The scooter assembly of claim 8 further comprising a handlebar assembly attached to the steer tube at or near a top portion of the steer tube.

10. The scooter assembly of claim 8 wherein the grind stripe is a substantially flat longitudinal member.

11. The scooter assembly of claim 8 wherein the at least one grind stripe comprises two grind stripes.

12. The scooter assembly of claim 8 wherein the grind stripe has a mating protrusion, a substantially flat mating surface, and a grinding surface, and the bottom surface of the deck defines at least one longitudinal mating recess.

13. The scooter deck assembly of claim 12 wherein the grind stripe is disposed in the longitudinal mating recess and the mating surface of the grind stripe mates with the bottom surface of the deck.

14. The scooter deck assembly of claim 13 wherein the grind stripe and the deck comprise interlocking dovetail slide-in features.

15. The scooter assembly of claim 8 further comprising an angled front plug attached to the front end of the deck such that the front plug extends substantially beyond the front end of the deck.

* * * * *